United States Patent [19]

Cavallaro

[11] Patent Number: 5,574,427

[45] Date of Patent: Nov. 12, 1996

[54] METHOD AND APPARATUS FOR DETECTING AIR BAG DEPLOYMENT

[75] Inventor: Eric S. Cavallaro, Indianapolis, India.

[73] Assignee: Delco Electronics Corporation, Kokomo, India.

[21] Appl. No.: 617,988

[22] Filed: Mar. 15, 1996

[51] Int. Cl.[6] .................................................. B60Q 1/00
[52] U.S. Cl. ........................ 340/436; 340/438; 340/426; 280/735; 364/424.05
[58] Field of Search ................................... 340/436, 438, 340/425.5, 904, 905, 901, 902, 426; 280/735, 730.2; 180/271, 282; 364/424.05

[56] References Cited

U.S. PATENT DOCUMENTS

| | | | |
|---|---|---|---|
| 3,022,392 | 2/1962 | Clemson | 340/436 |
| 3,646,583 | 2/1972 | Souderi | 340/436 |
| 3,990,040 | 11/1976 | Gleitz et al. | 340/436 |
| 4,067,411 | 1/1978 | Conley et al. | 340/426 |
| 4,673,937 | 6/1987 | Davis | 342/72 |
| 4,950,915 | 8/1990 | Spies et al. | 280/735 |
| 5,482,314 | 1/1996 | Corrado | 280/735 |
| 5,484,166 | 1/1996 | Mazur et al. | 340/436 |

OTHER PUBLICATIONS

Rouhana et al., "Investigation Into the Noise Associated With Air Bag Deployment—Part I—Measurement Technique and Parameter Study," SAE paper No. 942218, Oct. 31, 1994.

*Primary Examiner*—Thomas Mullen
*Assistant Examiner*—Van T. Trieu
*Attorney, Agent, or Firm*—Jimmy L. Funke

[57] ABSTRACT

An arrangement in the passenger compartment of a vehicle independent of a SIR system responds to the impulse noise of an inflating air bag as well as to vehicle acceleration to determine that the air bag has inflated, and then activates a communication device to transmit an emergency signal. A noise sensing transducer is either a pressure sensor or a microphone, and an accelerometer detects minimal conditions for a crash. A microprocessor evaluates the output signal and the acceleration to decide whether to signal the communication device.

11 Claims, 1 Drawing Sheet

METHOD AND APPARATUS FOR DETECTING AIR BAG DEPLOYMENT

FIELD OF THE INVENTION

This invention relates to the detection of air bag deployment in a motor vehicle and particularly to such detection which is electrically and structurally independent of an air bag deployment system.

BACKGROUND OF THE INVENTION

It is becoming commonplace to equip automotive vehicles with supplemental inflatable restraint (SIR) systems which sense a crash of significant severity and deploy air bags for the protection of vehicle occupants. Since such a crash may be very severe occupants may need emergency assistance and yet be unable to summon help. It is therefore proposed to automatically send an emergency signal whenever an air bag is deployed. Remote stations receiving such a signal will then be able to dispatch emergency services. A variety of communication systems are available for use in a vehicle and could be utilized for an emergency signal. The issue then is how to detect an air bag deployment for the purpose of activating a communication device.

It has been proposed to detect deployment by monitoring messages from the SIR system on the vehicle bus. A disadvantage of this approach is that the bus is likely to fail during a crash. Such buses are not designed for this purpose. Further the cost to power the SIR controller for bus activity would by prohibitive. A long term solution is to add a wire to couple the SIR to a communication device. This solution is not readily applicable to current vehicles or those which have been designed and qualified for SIR operation since such a system change would likely require the significant step of repeating a crash series for revalidation.

To avoid such concerns, it is desirable to detect air bag deployment independently of the SIR system. It is also desirable that detection arrangement be applicable to all types and makes of SIR systems. Then the detection and signaling apparatus could be produced as an aftermarket item for installation in existing vehicles. It is also desirable that such an apparatus be simple and inexpensive.

SUMMARY OF THE INVENTION

It is therefore an object of the invention to detect air bag deployment without direct coupling to a SIR system and issue a signal upon deployment. Another object is detect air bag deployed by a SIR system without any alteration of the SIR system. Still another object is to carry out such detection for any type of SIR system.

The rapid inflation of an air bag in the passenger compartment of a vehicle is accompanied by a characteristic impulse noise. This is detected by a transducer in the passenger compartment and analyzed by an algorithm embodied in a microprocessor. In addition, some kind of accelerometer is used to arm the detector when acceleration consistent with a crash occurs. The transducer may be either a pressure transducer or a microphone. In the case of pressure sensing, the algorithm would look for a pressure change of a given magnitude within a specified time interval to indicate deployment. For a microphone, the microprocessor would look for a burst of acoustical energy to signify the deployment. If that condition is satisfied and the required acceleration is concurrently detected, the microprocessor will activate a communication device to send an emergency signal.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
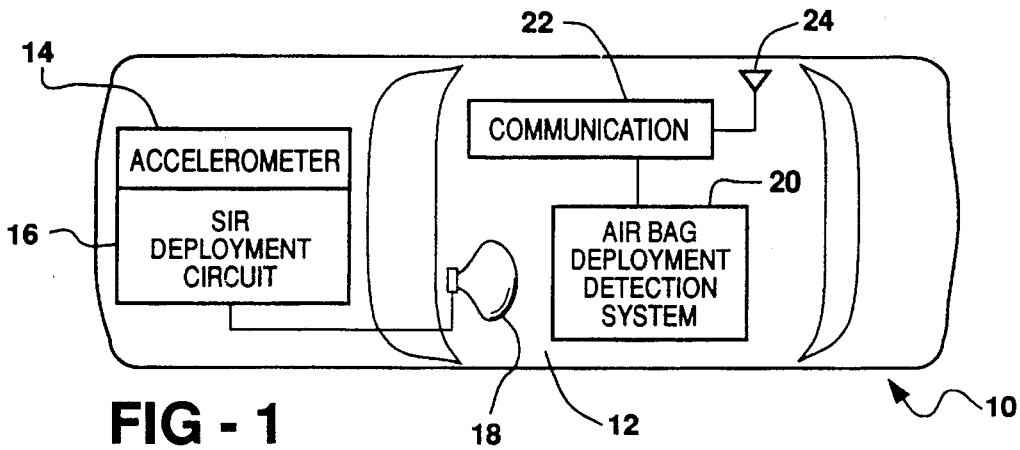
FIG. 1 is a block diagram of a SIR system and a deployment detection system in a vehicle according to the invention.

Referring to FIG. 1, an automotive vehicle 10 having a passenger compartment 12 is equipped with a SIR system including an accelerometer 14, a deployment circuit 16 and an air bag 18, shown in inflated state. Although the air bag 18 is mounted in the passenger compartment to interact with an occupant, the accelerometer and the deployment circuit may be in either the passenger compartment or outside the compartment as shown. In operation, the accelerometer senses the vehicle acceleration which is caused by a crash and the deployment circuit 16 evaluates the acceleration to determine crash severity and decides whether to deploy the air bag 18.

A deployment detection system 20 separate from and independent of the SIR system senses the sound or the pressure within the passenger compartment; for that purpose the detection system 20 or at least a transducer is in the passenger compartment 12. A communication device 22 equipped with an antenna 24 is coupled to the detection system. The communication device is capable of sending an emergency signal to an assistance agency such as medical emergency, police, or fire service. The device may employ any available technology such as cellular telephone, personal communication system (PCS), enhanced specialized mobile radio (ESMR), two-way radio or citizens band radio. As a part of the communication device there is included some means of identifying the location of the vehicle and including that data in the signal. It is known, for example, for automotive vehicles to employ a Global Positioning System based on satellite communication to accurately establish vehicle location.

Figure 2:
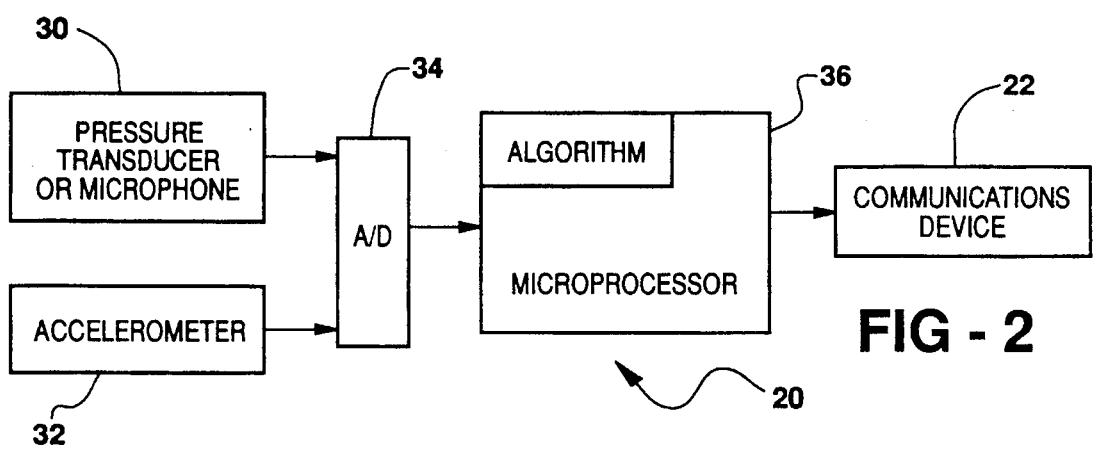
FIG. 2 is a block diagram of the deployment detection system of FIG. 1.

The deployment detection system 20, shown in FIG. 2, comprises a transducer 30 which may be either a pressure transducer or a microphone and an accelerometer 32, both coupled by an A/D circuit 34 to a microprocessor 36 programmed with an algorithm. The air bag inflation causes an impulse noise which is characterized by a large rapid pressure increase and by an acoustic burst. A pressure transducer measurement is then readily sampled and evaluated by the microprocessor to determine whether the pressure increases by a certain amount within a set time interval. For example, the pressure increase is 1.5 kPa in a time interval which may be 3 ms. If this occurs, one condition is met for activating a signal. When a microphone is used the acoustic output signal exceeds a time-frequency threshold when the air bag deploys, and this indicates that the one condition is met. Such a time-frequency measurement involves detecting a characteristic acoustic frequency of the air bag inflation and assuring that the characteristic signal amplitude remains above a threshold for a prescribed time, say 3 ms, to distinguish from similar but shorter signals due to noise. The capability of detecting airbag inflation impulse noise by a pressure sensor or a microphone has already been established as reported by Rouhana et al, "Investigation Into the Noise Associated With Air Bag Deployment: Part 1—Measurement Technique and Parameter Study", SAE 942218 (p-279) which is incorporated herein by reference.

Meeting the one condition may be sufficient to justify sending an emergency signal, but to prevent false signals it is preferred to require a second condition occurring concurrently with the first condition. The system 20 is secured to the Vehicle body so that the accelerometer 32 will respond to vehicle acceleration. The accelerometer is used to assure that an emergency signal is inhibited unless there is at least minimal vehicle acceleration over a set interval which is indicative of a crash. Where the accelerometer 32 has an analog output the A/D converter digitizes the output and the microprocessor 36 compares the acceleration to a threshold and measures the time that it exceeds the threshold. Another type of accelerometer is a mechanical ball-in-tube arming sensor which closes a switch when a certain acceleration is reached. The output is a logic 1 or 0 which does not require the A/D converter 34 and thus is connected directly to the microprocessor. In that case the microprocessor only needs to sense the time that the arming sensor switch is closed. In either case the time of concurrent satisfaction of both conditions must reach a stated amount, say, 3 ms, to assure that the noise signals and detected acceleration are a result of a crash and air bag deployment.

Figure 3:
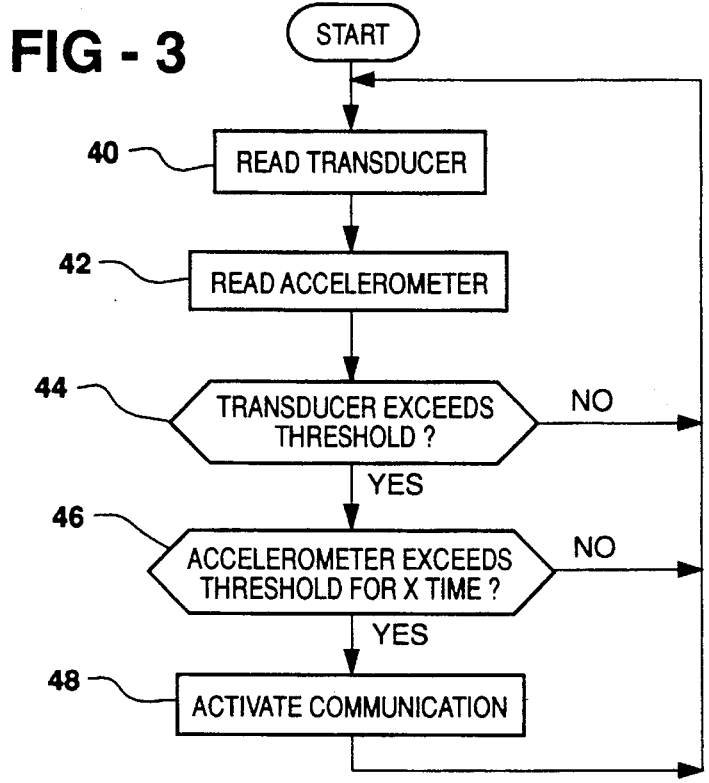
FIG. 3 is a flow chart representing algorithm used in the detection system, according to the invention.

The algorithm is represented by the flow chart of FIG. 3. In step 40 the pressure transducer or microphone is read and in step 42 the accelerometer 32 is read. In step 44 it is determined whether the pressure increase reaches a threshold value within a time period or the acoustic value reaches a threshold. If so, it is then determined in step 46 if the accelerometer exceeds a threshold (or is closed) for a set time concurrent with continued satisfaction of step 44. The set time is on the order of 3 ms but is subject to adjustment to suit a particular application. If the step 46 condition is met, the communication device 22 is activated to send an emergency signal in step 48. Thus when the conditions in steps 44 and 46 are concurrently met a signal is transmitted but if either step 44 or 46 answers that a condition is not met the program returns to the beginning.

It will thus be appreciated that the deployment detection method and apparatus is wholly independent of the SIR deployment system and is operable with SIR systems of different makes. Further, it is seen that the detection system is simple and inexpensive and easily installed in a vehicle.

The embodiments of the invention in which an exclusive property or privilege is claimed are defined as follows:

1. In a motor vehicle equipped with an air bag system, a method of detecting air bag deployment independently of the air bag system comprising the steps of:

sensing noise in the vehicle;

evaluating the noise to detect impulse noise associated with air bag deployment; and activating a communication system to transmit a signal in response to detection of the impulse noise.

2. The invention as defined in claim 1 wherein:

the step of sensing noise comprises monitoring a microphone output in a vehicle passenger compartment;

the step of evaluating the noise comprises establishing a time-frequency threshold, determining the time-frequency of the microphone output and comparing the determined time-frequency to the threshold.

3. The invention as defined in claim 1 wherein:

the step of detecting noise comprises monitoring a pressure transducer in a vehicle passenger compartment;

the step of evaluating the noise comprises sampling the pressure sensor output for pressure changes exceeding a set amount in a specified time period.

4. The invention as defined in claim 1 wherein the vehicle includes an accelerometer and further includes the steps of:

sensing vehicle acceleration; and allowing communication of a signal only when the sensed acceleration is above a threshold.

5. The invention as defined in claim 1 wherein the vehicle includes an accelerometer and further includes the steps of:

sensing vehicle acceleration; and allowing communication of a signal only when the sensed acceleration is above a threshold for a predetermined time.

6. The invention as defined in claim 1 wherein the vehicle includes an arming device responsive to vehicle and acceleration further includes the steps of:

closing the arming device in response to a predetermined vehicle acceleration; and allowing communication of a signal only when the arming device is closed for a predetermined time.

7. Apparatus independent of an air bag system for issuing a signal when a vehicle air bag is deployed comprising:

a transducer in the vehicle passenger compartment for sensing the impulse noise caused by air bag deployment;

means for coupling the transducer output to a microprocessor;

the microprocessor being programmed with an algorithm for determining from the transducer output whether a deployment has occurred; and a communication device activated by the microprocessor to issue an emergency signal when deployment has occurred.

8. The invention as defined in claim 7 wherein the transducer is a pressure sensor.

9. The invention as defined in claim 7 wherein the transducer is a microphone.

10. The invention as defined in claim 7 wherein:

the apparatus includes an accelerometer connected by the coupling means to the microprocessor; and to activate the communication device the algorithm requires the accelerometer output to exceed a threshold and at the same time for the transducer output to indicate deployment.

11. The invention as defined in claim 7 wherein:

the apparatus includes an arming sensor connected to the microprocessor; and to activate the communication device the algorithm requires the arming sensor to be actuated and at the same time for the transducer output to indicate deployment.

\* \* \* \* \*